United States Patent
Gamble (10) Patent No.: US 10,601,299 B2
(45) Date of Patent: Mar. 24, 2020

(54) HIGH TEMPERATURE SUPERCONDUCTOR GENERATOR WITH INCREASED ROTATIONAL INERTIA

(71) Applicant: American Superconductor Corporation, Devens, MA (US)

(72) Inventor: Bruce B. Gamble, Lenox, MA (US)

(*) Notice: Subject to any disclaimer, the term of this patent is extended or adjusted under 35 U.S.C. 154(b) by 120 days.

(21) Appl. No.: 15/697,549

(22) Filed: Sep. 7, 2017

(65) Prior Publication Data

US 2019/0074757 A1    Mar. 7, 2019

(51) Int. Cl.
| | |
|---|---|
| *H02K 55/04* | (2006.01) |
| *H02K 11/01* | (2016.01) |
| *H02K 7/18* | (2006.01) |
| *H02K 7/00* | (2006.01) |
| *F01D 15/10* | (2006.01) |
| *B63H 21/17* | (2006.01) |
| *H02K 9/00* | (2006.01) |

(52) U.S. Cl.
CPC .............. *H02K 55/04* (2013.01); *B63H 21/17* (2013.01); *F01D 15/10* (2013.01); *H02K 7/003* (2013.01); *H02K 7/1823* (2013.01); *H02K 11/01* (2016.01); *B63H 2021/173* (2013.01); *F05D 2220/764* (2013.01); *H02K 9/005* (2013.01)

(58) Field of Classification Search
CPC ........ H02K 55/04; H02K 11/01; H02K 7/003; H02K 7/1823; H02K 9/005; B63H 21/17; B63H 2021/173; F01D 15/10; F05D 2220/764

See application file for complete search history.

(56) References Cited

U.S. PATENT DOCUMENTS

| | | | |
|---|---|---|---|
| 3,742,265 A | 6/1973 | Smith | |
| 4,267,473 A * | 5/1981 | Gamble | H02K 55/04 310/52 |

(Continued)

FOREIGN PATENT DOCUMENTS

| | | |
|---|---|---|
| CN | 203608011 U | 5/2014 |
| CN | 204886526 U | 12/2015 |

OTHER PUBLICATIONS

International Search Report with Written Opinion, dated Dec. 6, 2018, received in international patent application No. PCT/US2018/038674, 13 pages.

*Primary Examiner* — Tulsidas C Patel
*Assistant Examiner* — Joseph Ortega
(74) *Attorney, Agent, or Firm* — Verrill Dana, LLP; John W. Powell (57) ABSTRACT

A high temperature superconductor (HTS) rotating machine having a longitudinal axis and having a first rotational inertia. There is a cylindrical stator assembly disposed about the longitudinal axis and a cylindrical rotor assembly disposed within the stator assembly. The rotor assembly is configured to rotate within the stator assembly about the longitudinal axis. The rotor assembly includes at least one HTS winding assembly which, in operation, generates a magnetic flux linking the stator assembly. There is a cylindrical electromagnetic shield disposed about the at least one HTS winding assembly having a second rotational inertia. There is a cryogenic cooling system for cooling the at least one superconducting winding assembly of the rotor assembly. The second rotational inertia is at least eighty percent (80%) of the first rotational inertia.

12 Claims, 5 Drawing Sheets

(56) References Cited

U.S. PATENT DOCUMENTS

| | | | | |
|---|---|---|---|---|
| 5,331,819 A * | 7/1994 | Matsuda | | H02K 1/28 310/52 |
| 5,482,919 A * | 1/1996 | Joshi | | F25B 9/14 310/52 |
| 5,585,772 A * | 12/1996 | Joshi | | H01L 41/12 310/26 |
| 5,625,548 A * | 4/1997 | Gold | | H02M 1/08 363/98 |
| 5,777,420 A * | 7/1998 | Gamble | | H02K 55/04 310/10 |
| 5,912,607 A * | 6/1999 | Kalsi | | H01F 6/06 335/216 |
| 5,987,342 A * | 11/1999 | Scudiere | | B32B 37/144 174/125.1 |
| 6,129,477 A * | 10/2000 | Shoykhet | | F16C 3/026 310/216.122 |
| 6,140,719 A * | 10/2000 | Kalsi | | H02K 55/04 310/261.1 |
| 6,489,701 B1 * | 12/2002 | Gamble | | H02K 3/24 310/179 |
| 6,597,082 B1 * | 7/2003 | Howard | | H02K 3/47 310/201 |
| 6,664,672 B2 * | 12/2003 | Kalsi | | H02K 11/01 310/57 |
| 6,674,206 B2 * | 1/2004 | Maguire | | H02K 55/04 310/179 |
| 6,759,781 B1 * | 7/2004 | Bushko | | H02K 3/47 310/179 |
| 6,879,081 B1 * | 4/2005 | Howard | | H02K 3/24 310/418 |
| 7,282,832 B2 * | 10/2007 | Howard | | H02K 55/04 310/261.1 |
| 7,592,721 B2 * | 9/2009 | Winn | | H02K 55/04 310/52 |
| 7,786,645 B2 * | 8/2010 | Gamble | | H02K 3/24 310/214 |
| 7,834,510 B2 * | 11/2010 | Winn | | H02K 3/47 310/261.1 |
| 8,035,246 B2 * | 10/2011 | Winn | | F03D 15/20 290/55 |
| 8,154,144 B2 * | 4/2012 | Muller | | H02K 3/47 290/53 |
| 8,154,157 B2 * | 4/2012 | Wiezoreck | | H02K 3/24 310/12.21 |
| 8,249,758 B2 * | 8/2012 | Schugart | | H02J 3/16 290/44 |
| 8,319,390 B2 * | 11/2012 | Snitchler | | H02K 1/165 310/216.097 |
| 8,436,499 B2 * | 5/2013 | Zhang | | H02K 55/04 310/52 |
| 8,478,374 B2 * | 7/2013 | Maguire | | H01B 12/02 174/125.1 |
| 8,517,749 B2 * | 8/2013 | Marshall | | F16L 25/01 439/194 |
| 8,575,790 B1 * | 11/2013 | Ogilvie | | H02N 15/04 310/12.04 |
| 8,791,052 B2 * | 7/2014 | Tanner | | H01L 39/143 505/230 |
| 10,355,549 B1 * | 7/2019 | Haran | | H02K 1/12 |
| 2004/0104632 A1 | 6/2004 | Keene et al. | | |
| 2006/0267427 A1 | 11/2006 | Matsubara et al. | | |
| 2010/0259117 A1 * | 10/2010 | Goodzeit | | H02K 55/02 310/52 |
| 2011/0148238 A1 * | 6/2011 | Goodzeit | | H02K 55/00 310/126 |
| 2012/0094555 A1 * | 4/2012 | Calverley | | B63H 23/24 440/6 |
| 2013/0270937 A1 * | 10/2013 | Rasmussen | | H02K 9/19 310/54 |
| 2014/0247022 A1 * | 9/2014 | Frauenhofer | | H02K 55/04 322/90 |
| 2015/0111752 A1 * | 4/2015 | Guina | | H02K 31/00 505/163 |
| 2017/0149309 A1 * | 5/2017 | Bauer | | H02K 19/14 |
| 2019/0267885 A1 * | 8/2019 | Frank | | H02K 9/20 |
| 2019/0296629 A1 * | 9/2019 | Lipo | | H02K 9/19 |

* cited by examiner

HIGH TEMPERATURE SUPERCONDUCTOR GENERATOR WITH INCREASED ROTATIONAL INERTIA

FIELD OF THE INVENTION

This invention relates to high temperature superconductor (HTS) generators and more specifically to such a HTS generator with increased rotational inertia.

BACKGROUND OF THE INVENTION

The concept of an all-electric ship, which may include the use of electrical means for all power needs in lieu of other means such as mechanical, pneumatic, and hydraulic, is gaining momentum in both U.S. and foreign navies. Versatility in electric power availability will enable new varieties of weapons and ship systems. Some proposed new weapons present especially rigorous power supply requirements. Electro-thermal, chemical, and electromagnetic guns and high-powered laser or microwave directed-energy weapons, for example, require large amounts of power over very short time periods, as do electric rail aircraft launchers (electric catapults), which are technically similar to electromagnetic guns.

Minimizing space and weight requirements onboard naval ships is of prime importance and, as a result, compact gas turbo-generators are an attractive option for generating the electric power needed to energize a ship's electric grid used to power all of the ship's systems. An attractive option would be to utilize a high temperature superconductor (HTS) generator with the turbo-generator to further reduce size and weight of the power source for the ship power grid. However, using a turbo-generator with an HTS generator, results in a relatively low rotational inertia system which is not capable of properly handling the rigorous power requirements of the above described weapon systems and results in disruptive transients imparted on the ship power grid.

With relatively low rotational inertia in the turbo-generator, the torque imposed during the pulsed load has a more significant impact in reducing the rotational speed than with a higher rotational inertia turbo-generator. A drop in rotational speed results in a proportionate drop in frequency, voltage and power from the turbo-generator. To overcome these issues, additional power quality components, such as series inductance or other energy storage means, could be added to the system using the HTS generator. However, they would increase system cost and require additional space. Alternatively, a conventional (non-HTS generator), with increased length and rotational inertia, could be used to overcome the transient problem; however, the additional size and weight of the conventional generator would certainly be a drawback particularly on a ship with constrained bulkhead spacing.

SUMMARY OF THE INVENTION

In one aspect, the invention features a high temperature superconductor (HTS) rotating machine having a longitudinal axis and having a first rotational inertia. The rotating machine includes a cylindrical stator assembly disposed about the longitudinal axis and a cylindrical rotor assembly disposed within the stator assembly and configured to rotate within the stator assembly about the longitudinal axis. The rotor assembly comprises at least one HTS winding assembly which, in operation, generates a magnetic flux linking the stator assembly. There is a cylindrical electromagnetic shield disposed about the at least one HTS winding assembly and the cylindrical electromagnetic shield has a second rotational inertia. There is a cryogenic cooling system for cooling the at least one superconducting winding assembly of the rotor assembly. The second rotational inertia is at least eighty percent (80%) of the first rotational inertia.

In other aspects of the invention, one or more of the following features may be included. The at least one HTS winding may comprise N pole pairs, p. The rotating machine may have a radius, R1, from the longitudinal axis to the at least one HTS winding. The cylindrical electromagnetic shield may have a thickness, t, and the thickness t may be greater than 50% of R1/p. The cylindrical electromagnetic shield may comprise metal. The metal may comprise one or more of copper, steel, lead, gold, tungsten, and spent uranium.

Another aspect the invention features a turbo-generator having a turbine and a shaft interconnected at a first end to the turbine. There is a high temperature superconductor (HTS) rotating machine connected to a second end of the shaft and having a longitudinal axis and a first rotational inertia. The HTS rotating machine includes a cylindrical stator assembly disposed about the longitudinal axis. There is a cylindrical rotor assembly disposed within the stator assembly and configured to rotate within the stator assembly about the longitudinal axis. The rotor assembly includes at least one HTS winding assembly which, in operation, generates a magnetic flux linking the stator assembly. There is a cylindrical electromagnetic shield disposed about the at least one HTS winding assembly. The cylindrical electromagnetic shield has a second rotational inertia. There is a cryogenic cooling system for cooling the at least one superconducting winding assembly of the rotor assembly. The second rotational inertia is at least eighty percent (80%) of the first rotational inertia.

In other aspects of the invention, one or more of the following features may be included. The at least one HTS winding may comprise N pole pairs, p. The rotating machine may include a radius, R1, from the longitudinal axis to the at least one HTS winding. The cylindrical electromagnetic shield may have a thickness, t, and wherein thickness t may be greater than 50% of R1/p. The cylindrical electromagnetic shield may comprise metal. The metal may comprise one or more of copper, steel, lead, gold, tungsten, and spent uranium.

BRIEF DESCRIPTION OF THE FIGURES

Embodiments of the present disclosure will now be described, by way of example only, with reference to the attached Figures, wherein.

DETAILED DESCRIPTION OF THE INVENTION

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein.

Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 1:
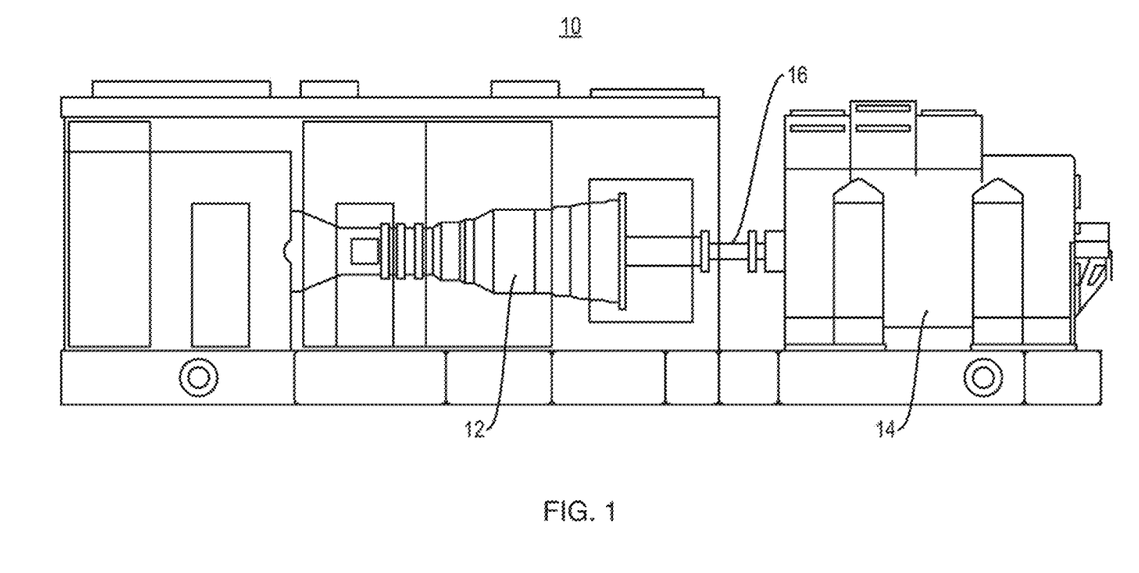
FIG. 1 shows a side elevational view of a shipboard turbo-generator having a HTS generator to produce power for a ship electrical grid.
Figure 2:
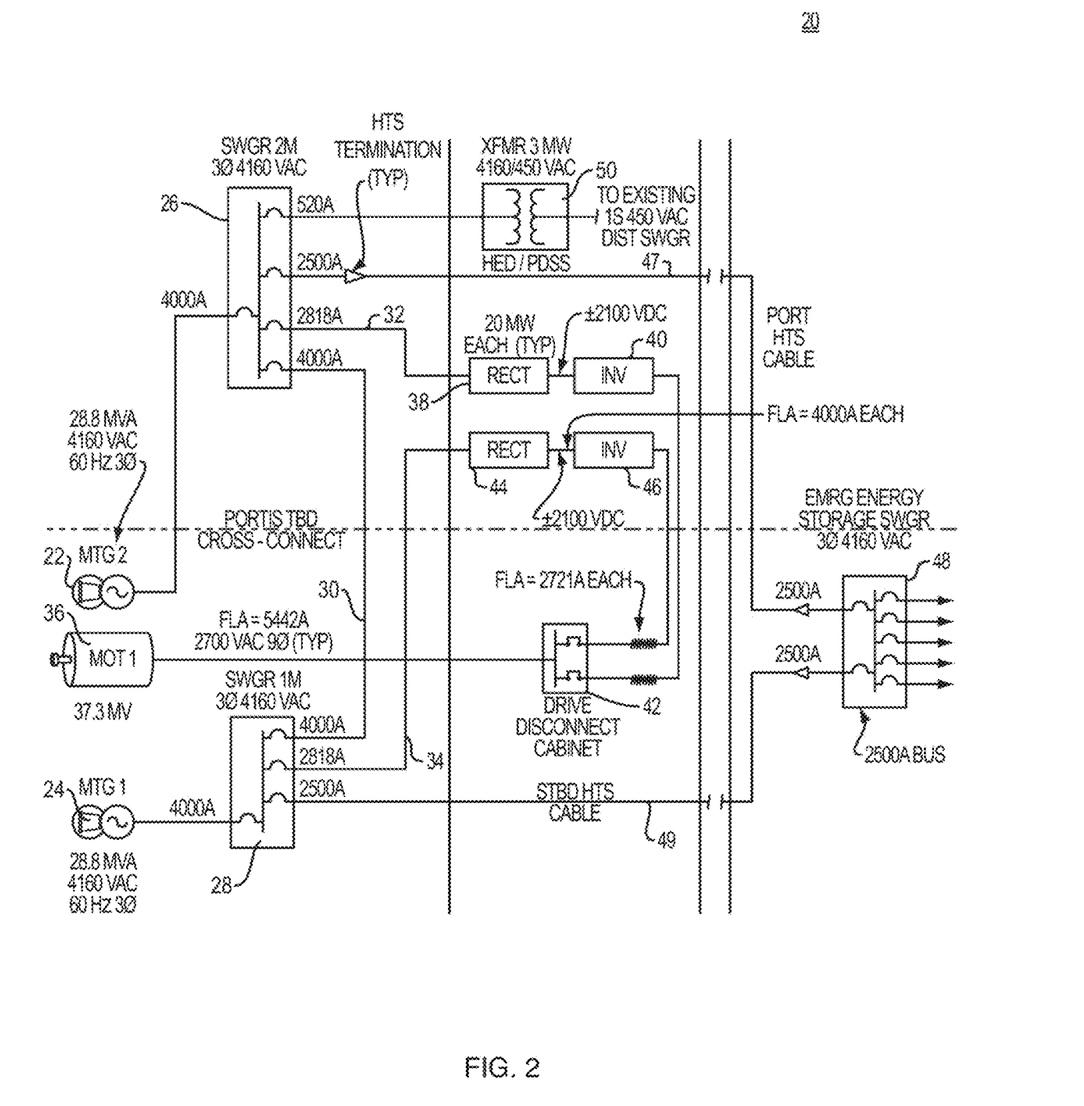
FIG. 2 shows a schematic diagram of a shipboard power grid utilizing two turbo-generators of the type shown in FIG. 1.

Referring to FIG. 1, there is shown turbo-generator 10 having gas turbine 12, which may rotate at high rpm and drive a HTS generator 14 via shaft 16. In this example, HTS generator 10 may be a 29 MW 3600 rpm 2 pole generator designed to operate at 60 Hz and designed to be powered by a 29 MW marine gas-turbine. However, the disclosure is not limited to any particular generator or gas-turbine power level, pole count or configuration and is applicable to various gas turbine systems. A possible ship power grid configuration 20 is depicted in FIG. 2 to include two turbo generators 22 and 24, which may be of the type shown in FIG. 1. Each generator in this example may output 29 MW of three phase power at 4160 V AC at 60 Hz. In this example, turbo-generator 22 is connected to power grid 20 through three phase switchgear 26 while turbo-generator 24 is connected to power grid 20 through three phase switchgear 28. Switchgear 26 is connected to switchgear 28 by port/starboard cable 30 so that in the event of a failure of one of the turbo-generators its respective switchgear can be back fed and powered by the operational turbo-generator. Cables 32 and 34 from switchgear 26 and 28, respectively, supply power to electric propulsion motor 36 which may be a conventional electric motor or a HTS motor. In this example, the voltage level input to variable speed electric motor 36 is nine phase AC at 2700 V; therefore, the power from switchgear 26 and 28 must be converted and conditioned by a suitable power converter system (not shown).

The output from switchgear 26 may be connected to rectifier 38 and then the DC may be converted to nine phase AC by inverter 40. Rectifier 38 and inverter 40 form a motor drive for controlling the current input to/rotational speed of motor 36 when they are connected to the motor 36 by disconnect cabinet 42. The output from switchgear 28 may be converted to DC by rectifier 44 and then the DC may be converted to nine phase AC by inverter 46. Rectifier 44 and inverter 46 form a motor drive for controlling the current input to/rotational speed of motor 36 when they are connected to the motor 36 by disconnect cabinet 42. Typically, only one of the motor drives is connected via the disconnect cabinet 42 to motor 36 at one time and the other is used as a back-up source in the case of a failure or maintenance, for example.

Power grid 20 is also configured to supply power to pulsed power loads (not shown) through energy storage switchgear 48 powered by cables 47 and 49 connected to switchgear 26 and 28, respectively. In addition, transformer 50 connected to switchgear 26 converts 4160 V AC to 450 V AC and feeds that to distribution switchgear (not shown) to deliver lower voltage power to various systems on the ship.

Figure 3:
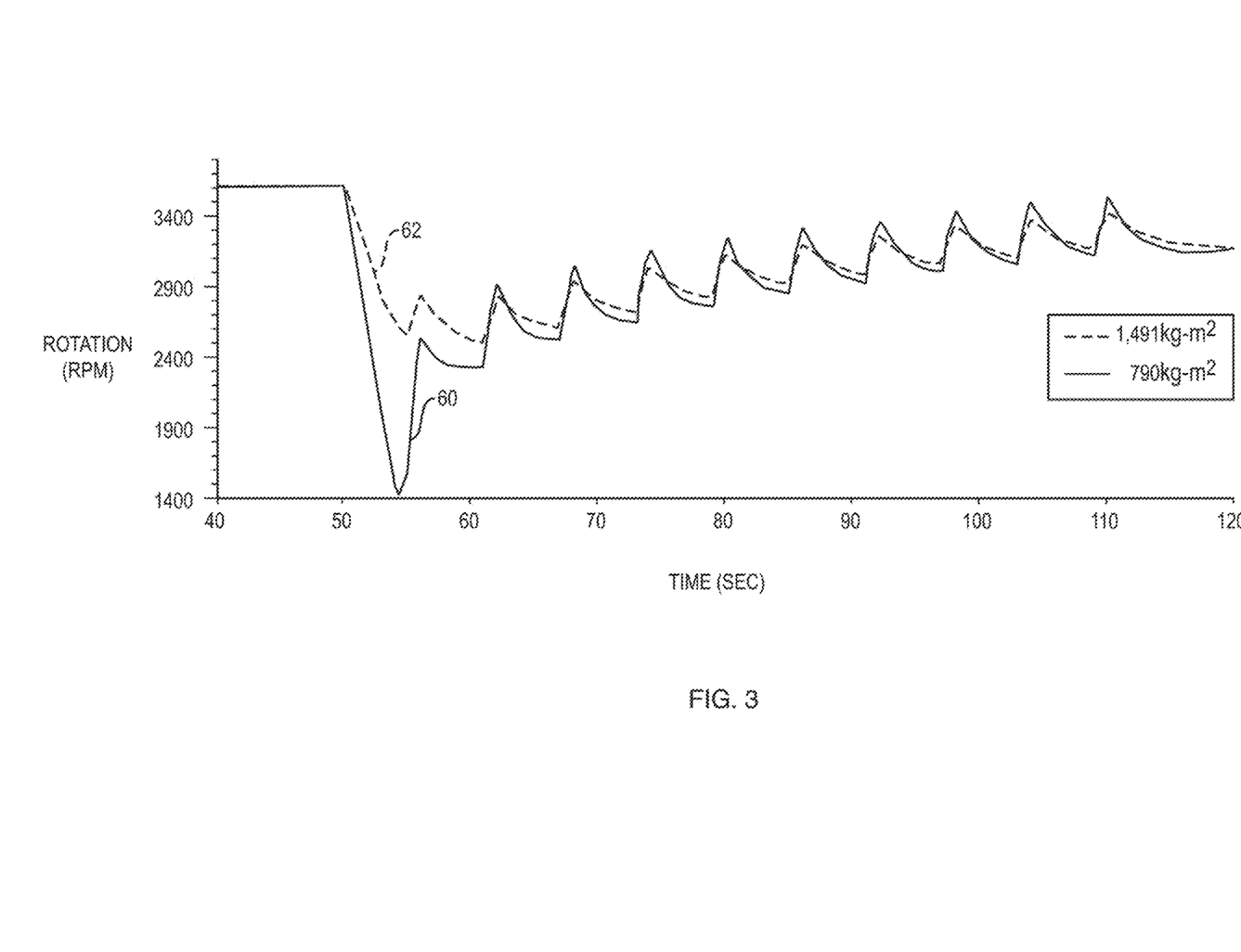
FIG. 3 shows a plot of turbo-generator rotational speed over time to depict the impact of pulsed power loads on generator rotational speed and hence power output.

Pulsed power loads may consist of several seconds (e.g. 5 seconds) of very high power draw (e.g. 10 MW or greater) through the energy storage switchgear 48 followed by a pause (e.g. 1 second) with no energy draw. The system design assumes that this cycle will be repeated indefinitely. As noted above, such pulsed loads can severely impact the proper operation of grid 20. A drop in rotational speed results in a proportionate drop in frequency, voltage and power from the turbo-generator. In FIG. 3, the impact on the rotational speed of such a pulsed load on turbo-generator 22/24 with a HTS generator is depicted over multiple pulse periods (assuming only one of the turbo-generators is operational).

As shown by waveform 60, turbo-generator rpm dips from 3400 to approximately 1400 over the course of a few seconds with the initial pulsed load of 18 MW. The rotational speed of the turbo-generator recovers somewhat over time as the cyclic 18 MW pulses continue, but it still remains substantially below its initial 3600 rpm rotational speed. In this cases, the estimated rotational inertia of the generator is approximately 790 kg-m$^2$, which is based on the use of a HTS generator optimized for cost for a 29 MVA turbo-generator. In this example, the EM shield may be formed of steel and copper with an approximate thickness of 10 cm (4 in). In a weight optimized design, which may use aluminum in the EM shield, the rotational inertia may be significantly lower than in the cost optimized design.

With relatively low inertia in the turbo-generator, the torque imposed during the pulsed load on the turbo-generator has a more significant impact in reducing the rotational speed. In the example of waveform 60, this translates into a nearly 60% drop in rotational speed and a commensurate drop in voltage, frequency, and power on grid 20, which may significantly disrupt normal operation of the ship's power systems. Moreover, with this level of cyclic loading on the turbo-generator it is certain to shorten turbine life.

With greater rotational inertia, the impact of the torque on the turbo-generator is reduced. Waveform 62 shows the impact on the rotational speed (approximately a 30% initial drop) of the turbo-generator, with a cyclic pulsed load of 18 MW. In this case, the HTS generator used has an increased rotational inertia resulting in an overall turbo-generator rotational inertia of approximately 1496 kg-m$^2$. The EM shield may be formed of steel with an approximate thickness of 18 cm (7 in). As is evident from waveform 62, as compared to waveform 60, increasing the rotational inertia of the turbo-generator to 1496 kg-m$^2$ reduces substantially the impact of the initial and the subsequent cyclic pulsed loads on the rotational speed of the turbo-generator as well as the impact on voltage, frequency, and power on grid 20. Adding a tungsten alloy to the EM shield would further increase the rotational inertia to approximately 1817 kg-m$^2$.

Figure 4:
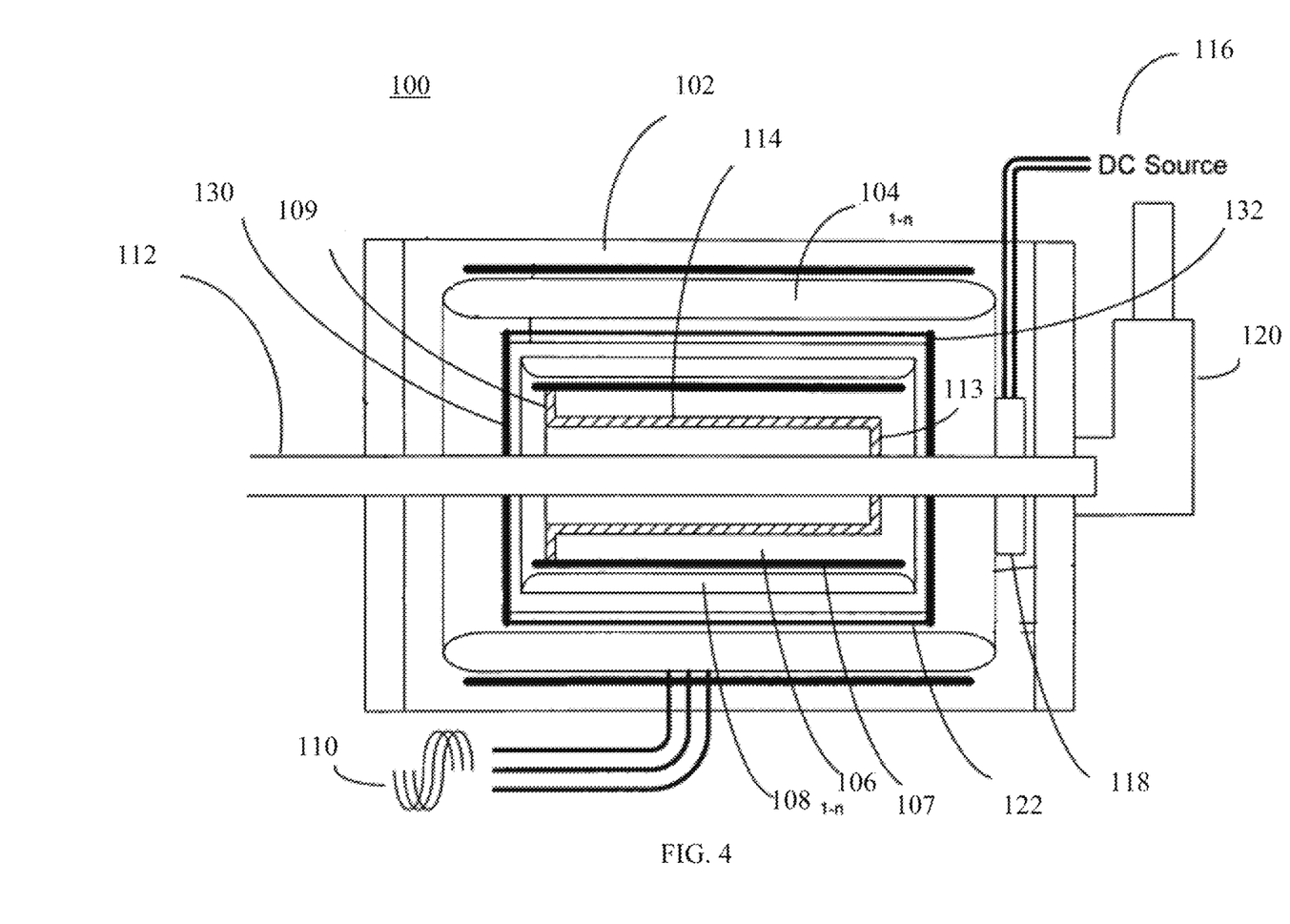
FIG. 4 shows a cross-sectional view of a HTS generator, taken along the length of the generator, designed to be optimized for size and weight reduction.

Referring to FIG. 4, there is shown a prior art HTS generator 100 which has been designed to be optimized for minimum size and weight. As with the lower rotational inertia generator that produced the waveforms in FIG. 3, this example may have an rotational inertia such that the overall rotational inertia of the turbo-generator will also be approximately 790 kg-m$^2$.

HTS generator 100 includes a stator assembly 102 having stator coil assemblies $104_{1-n}$. As is well known in the art, the specific number of stator coil assemblies $104_{1-n}$ included within stator assembly 102 varies depending on various design criteria, such as whether the machine is a single phase or a polyphase machine. For example, in one 29 MVA, 3-phase HTS generator described herein outputting 4160 V AC at 60 Hz, stator assembly 102 may include seventy-two (72) stator coil assemblies $14_{1-n}$.

A rotor assembly 106 rotates within stator assembly 102. As with stator assembly 102, rotor assembly 106 includes rotor winding assemblies $108_{1-n}$. In the same 29 MVA, 3-phase HTS generator, rotor assembly 106 may include two rotor winding assemblies (forming 2 poles), which may be in a saddle coil configuration, as they are well suited to high rpm generator applications. These rotor winding assemblies, during operation, generate a magnetic flux that links rotor assembly 106 and stator assembly 102. While this generator is designed as a two-pole machine, it will be understood by those skilled in the art that various pole count machines could be used and the particular design will be dependent upon the application.

During operation of generator 100, a three-phase voltage 110 is generated in stator coil assemblies $104_{1-n}$ which, in turn, is output to the power grid of the ship as shown, for example, in FIG. 2. The three-phase voltage in the stator coil assemblies $104_{1-n}$, is produced by the rotor winding magnetic flux generated by the rotor coil assemblies $108_{1-n}$ that links rotor assembly 106 and stator assembly 102, as the rotor rotates when driven by turbo-generator shaft 112.

The rotor winding assemblies $108_{1-n}$ may be mounted on an outside surface of support structure 107, which is connected to a first flange 109 that transfers the torque from torque tube 114. It should be noted that the rotor winding assemblies $108_{1-n}$ may, alternatively, be mounted on an inside surface support structure 107. Torque tube 114 is connected to a second flange 113, which is connected to turbo-generator shaft 112. Flanges 109 and 113 may be incorporated into torque tube 114 or may be separate assemblies. Of course, other torque tube designs may be used to transfer the torque from the shaft 112 to the rotor assembly in the cold space.

During operation of superconducting rotating machine 100, field energy 116, for example, from a DC current source (not shown) may be applied to rotor winding assembly $108_{1-n}$ through a slip ring/rotating disk assembly 118. Rotor winding assemblies $108_{1-n}$, require DC current to generate the magnetic field (and the magnetic flux) required to link the rotor assembly 106 and stator assembly 102.

Stator coil assemblies $104_{1-n}$ are formed of non-superconducting copper coil assemblies, for example, while rotor winding assemblies $108_{1-n}$ are superconducting assemblies incorporating HTS windings. Examples of HTS conductors include: thallium-barium-calcium-copper-oxide; bismuth-strontium-calcium-copper-oxide; mercury-barium-calcium-copper-oxide; and yttrium-barium-copper-oxide.

As these superconducting conductors only achieve their superconducting characteristics when operating at low temperatures, HTS generator 100 includes a refrigeration system 120. Refrigeration system 120 is typically in the form of a cryogenic cooler that maintains the operating temperature of rotor winding assemblies $108_{1-n}$ at an operating temperature sufficiently low to enable the conductors to exhibit their superconducting characteristics. Since rotor winding assemblies $108_{1-n}$ must be kept cool by refrigeration system 120, torque tube 114 may be constructed from a high strength, low thermal conductivity metallic material (such as Inconel™) or composite material (such as G-10 phenolic or woven-glass epoxy).

Rotor assembly 106 includes an electromagnetic shield 122 positioned between stator assembly 102 and rotor assembly 106 to shield or filter asynchronous fields from harmonics produced in the stator assembly 102. As rotor assembly 106 is typically cylindrical in shape, electromagnetic shield 122 is also typically cylindrical in shape. It is desirable to shield the rotor winding assemblies $108_{1-n}$ of rotor assembly 106 from these asynchronous fields. Accordingly, electromagnetic shield 122, which is fitted to rotor assembly 106, covers (or shields) rotor winding assemblies $108_{1-n}$ from the asynchronous fields and is constructed of a non-magnetic material (e.g., copper, aluminum, etc.). The electromagnetic shield 122 should be of a length sufficient to fully cover and shield rotor winding assemblies $108_{1-n}$. The case considered so far is steel and a thin overcoat of copper with the thicknesses selected to shield ac fields and withstand fault loads. Aluminum is lightest solution but steel could be selected if weight is of less interest than cost. The shield also provides vacuum containment and steel presents a simpler sealing solution with welding.

The electromagnetic shield 122 may be rigidly connected to shaft 112 via a pair of end plates 130, 132. This rigid connection can be in the form of a weld or a mechanical fastener system (e.g., bolts, rivets, splines, keyways, etc.). For shielding, the thickness of electromagnetic shield 122 varies inversely with respect to the frequency of the three-phase AC power 110, which in this example is 60 Hertz. For low pole count designs the thickness may be selected to withstand transient forces during fault. For this frequency, typically, the thickness of electromagnetic shield 122 would be no more than 10 cm (4 in) of steel and copper. In order to reduce the size and weight of the generator, prior art systems such as this one, minimized the thickness of the electromagnetic shield 122 to the point where it was of a sufficient thickness to filter the asynchronous fields and to support fault ovalizing forces on the shield, but no thicker, so as to minimize generator weight and size.

Figure 5A:
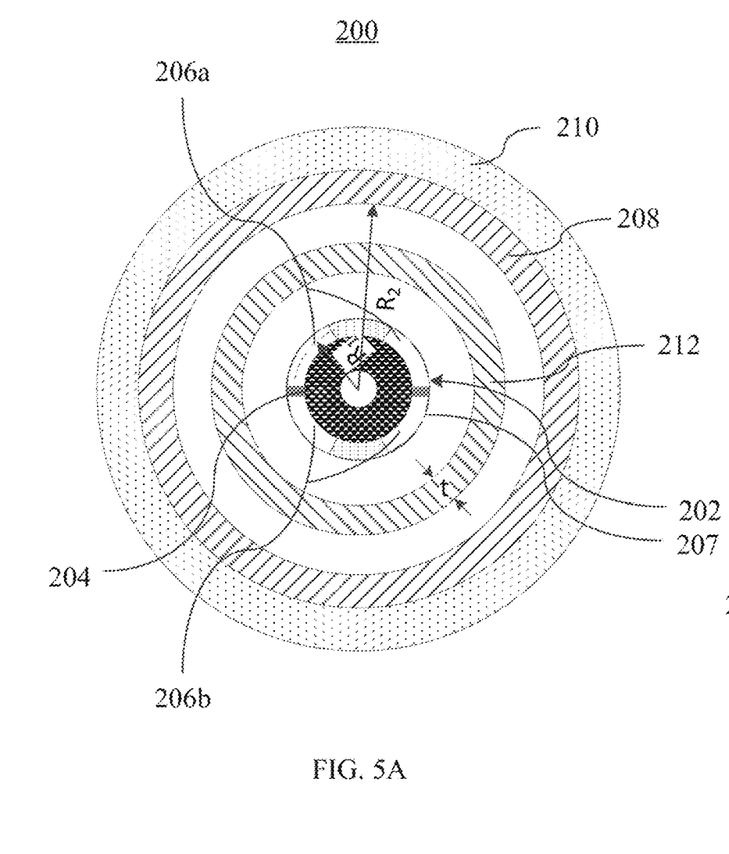
FIG. 5A shows a cross-sectional view of the type of HTS generator of FIG. 4, taken across the width of the generator, to depict the dimensions of the generator including electromagnetic shield thickness and the electromagnetic gap.

Although not shown in generator 100 of FIG. 4, an inner ferromagnetic core (e.g. an iron core) may be used to increase the magnetic permeance of the rotor and hence may allow for a reduced amount of HTS material needed to generate a given magnetic field. It also adds to the rotational inertia of the generator in a significant way. In FIG. 5A there is shown a schematic cross-sectional view of HTS generator 200, which is similar to the type of HTS generator shown in FIG. 4. The cross-sectional view is taken across the width of the generator, to depict the dimensions of the generator including electromagnetic shield thickness and the electromagnetic gap. In this example, HTS generator 100a includes a rotor assembly 202 having an inner iron core 204 depicted as a two pole generator. Rotor windings 206a and 206b are in the form of saddle coil windings and are each shown with two arc sections, which are joined at the ends to form the saddle coil.

In designing HTS generator 200, the limit on tip speed for HTS saddle coils 206a/b must be considered. Centrifugal loading on the HTS coils results in strain in the superconductor material. This strain is proportional to the square of the tip speed of the coils. Experience and analysis indicates that 150 m/sec tip speed is an acceptable limit for such coils. Generators for naval use may require over-speed testing up to 125% of rated speed. For a design speed of 3600 rpm, this corresponds to an over-speed test at 4,500 rpm requiring a field winding with a ~0.32 m radius from the longitudinal axis of the generator to the mid-plane of coils 206*a/b*, which is depicted as R1 in FIG. 5A. The saddle coils are supported on their outside by a coil support cylinder 207.

The nonrotating part of generator 200 begins at radius R2, which extends from the generator longitudinal axis to the inside radius of the stator 208, and consists of stator 208 and back iron 210. Outside of the coil support cylinder 207 is the EM shield 212, which is the outermost rotating member of rotor assembly 202. As described above, it shields the rotor assembly 202 from electromagnetic fields that are asynchronous with respect to the rotation to reduce AC losses in the HTS coil. The field strength produced by saddle coils 206*a/b* is proportional to the ampere-turns in each coil, but is inversely proportional to the electromagnetic ("EM") gap (R2−R1) between the saddle coils and stator. Thus, increasing the EM gap increases the number of ampere-turns and hence the amount of HTS wire needed to generate a given electromagnetic field.

The majority of the EM gap (R2−R1) consists of the EM shield 212 and in a weight or cost optimized design, the EM shield is only made thick enough to perform its shielding function and its weight/mass is minimized by selecting a low density material with shielding capabilities. The EM shield 212 thickness, t, is generally <40% of R1/p, where p is the number of pole pairs in the design (p=1 for a two pole generator). For this design the thickness, t, may be 10 cm (4 in) and the material used for the EM shield may be a moderate-density material such as steel.

To determine the rotational inertia for EM shield 212, the inner radius Ri and outer radius Ro and a mass M would be calculated as follows:

$$M(Ri^2+Ro^2)/2$$

which, in this case, is approximately 560 kg-m². The EM shield rotational inertia relative to the rotational inertia of the other system components in the turbo-generator would be as follows:

| Rotational Inertia - Cost Optimized Design | |
|---|---|
| EM Shield | 560 kg-m² |
| Inner Iron and Shafts | 143 kg-m² |
| Field and support | 87 kg-m² |
| Total Gen. Rotor | 790 kg-m² |
| Turbine | 96 kg-m² |
| Total | 886 kg-m² |

For this example, the rotational inertia of the EM shield relative to the rotational inertia of the total generator is approximately seventy percent (70%). For typical cost/weight optimized designs, the rotational inertia in the EM shield is generally ≤70% of the overall HTS generator rotational inertia.

Figure 5B:
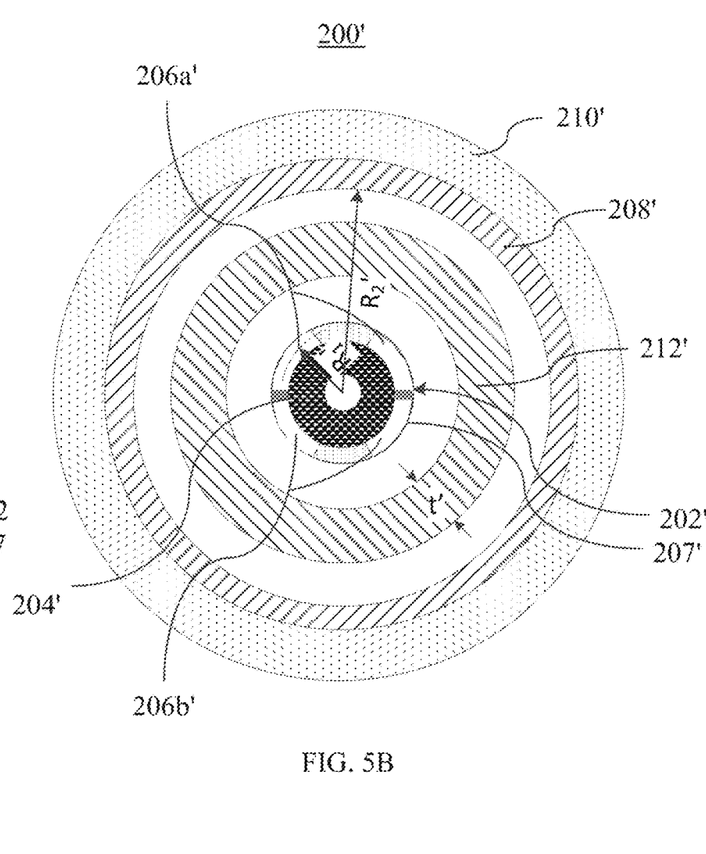
FIG. 5B shows a cross-sectional view of an HTS generator with increased rotational inertia according to an aspect of this invention, taken across the width of the generator, to depict the dimensions of the generator, including the electromagnetic shield thickness and the electromagnetic gap.

An HTS generator with increased rotational inertia is shown in FIG. 5B as HTS generator 200'. All components are essentially the same as HTS generator 200 of FIG. 5A, however, by constructing a thicker EM shield 212' the rotational inertia of the generator can be increased at the expense of additional ampere-turns in saddle coils 206*a'/b'*. In other words, a greater amount of HTS material will be required to produce the same electromagnetic field in HTS generator 200' as in HTS generator 200, since the EM gap (R2'−R1') of HTS generator 200' is greater than the EM gap (R2−R1), due to the increased thickness of the EM shield 212'.

For the increased rotational inertia design of HTS generator 200', the EM shield 212' thickness, t', may be ≥50% of R1/p. For this design, the thickness, t', may be approximately 18 cm (7 in). In addition to increasing the thickness of the EM shield to increase its rotational inertia, higher density materials could be used. Examples of such materials may include copper (8.96 g/cm3), steel (7.84 g/cm³), lead (11.32 g/cm³), gold (19.282 g/cm³), tungsten (19.25 g/cm³), and spent uranium (18.95 g/cm³). One or more of these materials may be used to construct the EM shield By selecting the appropriate thickness and material composition of the EM shield 212', the amount of additional rotational inertia of the EM shield can be tailored to obtain desired operational characteristics for the particular turbo-generator and expected level and frequency of pulsed power loads.

To determine the rotational inertia for EM shield 212', the inner radius Ri' and outer radius Ro' and a mass M' (using a combination of steel and tungsten alloy, for example) would be calculated as follows:

$$M'(Ri'^2+Ro'^2)/2$$

which, in this case, is approximately 1,477 kg-m². The EM shield rotational inertia relative to the rotational inertia of the other system components in the turbo-generator would be as follows:

| Rotational Inertia - Rotational Inertia Optimized Design | |
|---|---|
| EM Shield | 1,477 kg-m² |
| Inner Iron and Shafts | 151 kg-m² |
| Field and support | 92 kg-m² |
| Total Gen. Rotor | 1,720 kg-m² |
| Turbine | 96 kg-m² |
| Total | 1,816 kg-m² |

For this rotational inertia optimized example, the rotational inertia of the EM shield relative to the rotational inertia of the total generator is approximately eighty-five percent (85%). For typical rotational inertia optimized designs, the rotational inertia in the EM shield may be generally ≥80% of the overall HTS generator rotational inertia.

If this design with a thick EM shield were constructed with just stainless steel in the EM shield the generator rotational inertia would still be 1492 kg-m² which is still nearly 190% of the rotational inertia of the cost and weight optimized design.

The design of the HTS generator according to this invention has a number of important advantages; namely, it fits within a short axial length, has low reactance that avoids pole slipping in a highly pulsed application and has high rotational inertia While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure. In particular, using a powerful HTS winding to permit a high rotational inertia EM shield is effective at pole-counts higher than 2. An HTS field winding is also effective in shortening the length of the machine to permit the addition of a flywheel within a constrained axial length.

I claim:

1. A high temperature superconductor (HTS) rotating machine having a longitudinal axis, comprising:
    a cylindrical stator assembly disposed about the longitudinal axis;
    a cylindrical rotor assembly disposed within the cylindrical stator assembly and configured to rotate within the cylindrical stator assembly about the longitudinal axis, the cylindrical rotor assembly having a first rotational inertia and comprising:
        at least one HTS winding assembly which, in operation, generates a magnetic flux linking the cylindrical stator assembly; and
        a cylindrical electromagnetic shield disposed about the at least one HTS winding assembly, wherein the cylindrical electromagnetic shield has a second rotational inertia; and
        a cryogenic cooling system for cooling the at least one superconducting winding assembly of the cylindrical rotor assembly;
    wherein the second rotational inertia is at least eighty percent (80%) of the first rotational inertia.

2. The high temperature superconductor (HTS) rotating machine of claim 1 wherein the at least one HTS winding comprises p pole pairs.

3. The high temperature superconductor (HTS) rotating machine of claim 2 includes a radius, R1, from the longitudinal axis to the at least one HTS winding.

4. The high temperature superconductor (HTS) rotating machine of claim 3 wherein the cylindrical electromagnetic shield has a thickness, t, and wherein thickness t>50% of R1/p.

5. The high temperature superconductor (HTS) rotating machine of claim 4 wherein the cylindrical electromagnetic shield comprises metal.

6. The high temperature superconductor (HTS) rotating machine of claim 5 wherein the metal may comprise one or more of copper, steel, lead, gold, tungsten, and spent uranium.

7. A turbo-generator, comprising:
    a turbine;
    a shaft interconnected at a first end to the turbine; and
    a high temperature superconductor (HTS) rotating machine connected to a second end of the shaft and having a longitudinal axis; the HTS rotating machine, comprising:
    a cylindrical stator assembly disposed about the longitudinal axis;
    a cylindrical rotor assembly disposed within the cylindrical stator assembly and configured to rotate within the cylindrical stator assembly about the longitudinal axis, the cylindrical rotor assembly having a first rotational inertia and comprising:
        at least one HTS winding assembly which, in operation, generates a magnetic flux linking the cylindrical stator assembly; and
        a cylindrical electromagnetic shield disposed about the at least one HTS winding assembly, wherein the cylindrical electromagnetic shield has a second rotational inertia; and
        a cryogenic cooling system for cooling the at least one superconducting winding assembly of the cylindrical rotor assembly;
    wherein the second rotational inertia is at least eighty percent (80%) of the first rotational inertia.

8. The turbo-generator of claim 7 wherein the at least one HTS winding comprises p pole pairs.

9. The turbo-generator of claim 8 includes a radius, R1, from the longitudinal axis to the at least one HTS winding.

10. The turbo-generator of claim 9 wherein the cylindrical electromagnetic shield has a thickness, t, and wherein thickness t>50% of R1/p.

11. The turbo-generator of claim 10 wherein the cylindrical electromagnetic shield comprises metal.

12. The turbo-generator of claim 11 wherein the metal may comprise one or more of copper, steel, lead, gold, tungsten, and spent uranium.

* * * * *